(12) United States Patent
Campana

(10) Patent No.: US 8,517,312 B2
(45) Date of Patent: Aug. 27, 2013

(54) MULTI-SPAR PORT BOX JOINT

(71) Applicant: The Boeing Company, Chicago, IL (US)

(72) Inventor: Joseph H. Campana, Mill Creek, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/722,031

(22) Filed: Dec. 20, 2012

(65) Prior Publication Data
US 2013/0105629 A1 May 2, 2013

Related U.S. Application Data

(62) Division of application No. 12/857,750, filed on Aug. 17, 2010, now Pat. No. 8,348,196.

(51) Int. Cl.
B64C 3/00 (2006.01)

(52) U.S. Cl.
USPC ..................................... 244/123.1

(58) Field of Classification Search
USPC ................. 244/129.5, 123.1, 123.4, 130, 1 R
See application file for complete search history.

(56) References Cited

U.S. PATENT DOCUMENTS

| 3,417,946 | A | 12/1968 | Hartley |
| 4,741,943 | A | 5/1988 | Hunt |
| 5,817,269 | A | 10/1998 | Younie et al. |
| 6,561,459 | B2 | 5/2003 | Amaoka et al. |
| 7,575,194 | B2 | 8/2009 | Brown et al. |
| 2009/0206203 | A1 | 8/2009 | Crawford |
| 2012/0043422 | A1 | 2/2012 | Campana |

FOREIGN PATENT DOCUMENTS

| WO | WO2009003954 A1 | 1/2009 |
| WO | WO2012024051 A1 | 2/2012 |

OTHER PUBLICATIONS

International Search Report and Written Opinion of the International Searching Authority, dated Feb. 2, 2012, regarding Application No. PCT/US2011/044766 (WO2012024051), 12 pages.
Notice of Allowance, dated Sep. 10, 2012, regarding U.S. Appl. No. 12/857,750, 14 pages.

Primary Examiner — Timothy D Collins
Assistant Examiner — Nicholas McFall
(74) Attorney, Agent, or Firm — Yee & Associates, P.C.

(57) ABSTRACT

A method for connecting a wing. A frame for a wing may be positioned relative to a fuselage of an aircraft. The frame may have bays and comprise a front spar, a rear spar, and a number of spars located between the front and rear spars. A first number of skin panels may be on a first side of the frame, and a second number of skin panels may be on a second side of the frame. The first side may be opposite to the second side. Openings may be in the first and second numbers of skin panels. The openings may be in locations such that each bay has an opening and such that the openings may alternate between the first side and the second side between adjacent bays in the bays. The frame may be attached to the fuselage using the openings to access an interior of the frame.

11 Claims, 13 Drawing Sheets

MULTI-SPAR PORT BOX JOINT

This application is a divisional application of U.S. Patent Application No. 12/857,750 filed Aug. 17, 2010, status allowed.

BACKGROUND INFORMATION

1. Field

The present disclosure relates generally to aircraft and, in particular, to manufacturing aircraft. Still more particularly, the present disclosure relates to a method and apparatus for providing access to a joint in an aircraft.

2. Background

Aircraft are being designed and manufactured with greater and greater percentages of composite materials. Some aircraft may have more than 50 percent of their primary structure made from composite materials. Composite materials may be used in aircraft to decrease the weight of the aircraft. This decreased weight may improve payload capacities and fuel efficiencies. Further, composite materials may provide longer service life for various components in an aircraft.

For example, horizontal stabilizers may be formed from composite materials. The spars, skin panels, and other components in a horizontal stabilizer may be formed from composite materials. When joining two horizontal stabilizers to a centerline of an aircraft, spar boxes within the horizontal stabilizers may be joined to each other or to other structures in the aircraft. The two spar boxes may be joined through a tension fitting and/or a center box. A center box may be a structure that allows for the joining of two horizontal stabilizers to each other and/or to the center box. In joining the spar boxes to the centerline of the aircraft, access may be required to perform operations needed to form a joint to connect these components. In addition, these openings also may provide access to maintenance operators to inspect the joints after the aircraft has been in service.

The openings may not provide desired airflow over the horizontal stabilizers. As a result, access panels may be used to cover these openings. These access panels may have a design that may provide for desired airflow and load bearing for those portions of the horizontal stabilizers.

The use of access panels increases the number of parts that may be present in the horizontal stabilizers. As a result, a desired increase in complexity of the horizontal stabilizer may be present. Additionally, the access panels may have a design that may allow for a desired load to be placed on the horizontal stabilizers at those locations. These designs for the access panels may increase the weight of the aircraft. As a result, some gains in weight savings that may occur through the use of composite materials may be lost through the use of access panels.

Thus, it would be advantageous to have a method and apparatus that takes into account at least some of the issues discussed above, as well as other possible issues.

SUMMARY

In one advantageous embodiment, an apparatus may comprise a front spar, a rear spar, a number of spars located between the front spar and the rear spar, a first number of skin panels on a first side of a frame, a second number of skin panels on a second side of the frame, and a plurality of openings. The front spar, the rear spar, and the number of spars may form a frame having a plurality of bays. The first side of the frame may be substantially opposite to the second side of the frame. The plurality of openings may be in the first number of skin panels on the first side and in the second number of skin panels on the second side. The plurality of openings may be in locations such that each bay in a portion of the plurality of bays has an opening and such that openings alternate between the first side and the second side between adjacent bays in the plurality of bays in a manner that avoids two adjacent bays having openings on a same side.

In another advantageous embodiment, a multi-spar wing structure for an aircraft may comprise a front spar, a rear spar, a number of spars located between the front spar and the rear spar in which the front spar, the rear spar, and the number of spars form a frame, a first number of skin panels on a first side of the frame, a second number of skin panels on a second side of the frame, a plurality of openings, a plurality of covers, and a fuselage of the aircraft. The front spar may have a first opening to a first bay in a plurality of bays. The rear spar may have a second opening to a second bay in the plurality of bays. The frame may have a plurality of bays. The frame may be a part of a wing of the aircraft and may comprise a box for the wing. An end of the frame may be configured to be attached to at least one of a fuselage of the aircraft and a corresponding frame for a second wing. The first side of the frame may be substantially opposite to the second side of the frame. The plurality of openings may be in the first number of skin panels on the first side and in the second number of skin panels on the second side. The plurality of openings may be in locations such that each bay in a portion of the plurality of bays has an opening and such that openings alternate between the first side and the second side between adjacent bays in the plurality of bays in a manner that avoids two adjacent bays having openings on a same side. The portion of the plurality of bays, the first bay, and the second bay may form the plurality of bays. The locations of the plurality of openings may be selected to provide access to a joint system to which the end of the frame is connected in which the joint system is located substantially at a centerline of the fuselage of an aircraft and to increase a load that can be applied to the first number of skin panels and the second number of skin panels. An edge of the opening in the plurality of openings may be reinforced. The plurality of openings may have a shape selected from one of a circle, an oval, and a race track. The plurality of covers may be configured to cover a first number of openings and a second number of openings in the plurality of openings. The plurality of covers may be configured to increase the load that may be supported by the first number of skin panels and the second number of skin panels when the plurality of covers is installed in the first number of openings and the second number of openings and to reduce at least one of a pressure change inside the frame during flight of the aircraft on which the frame is associated and debris entering the plurality of bays.

In yet another advantageous embodiment, a method may be provided for connecting a wing. A first number of openings in a first number of skin panels may be formed on a first side of a frame. The frame may comprise a front spar, a rear spar, and a number of spars located between the front spar and the rear spar in which the frame may have a plurality of bays. The first number of skin panels may be on the first side of the frame. A second number of openings in a second number of skin panels may be formed on the second side of the frame. The first number of openings and the second number of openings may comprise a plurality of openings. The second number of skin panels may be on the second side of the frame in which the first side of the frame may be substantially opposite to the second side of the frame. The plurality of openings may be in locations such that each bay in a portion of the plurality of bays may have an opening and such that openings in the plurality of openings may alternate between the first side and the second side between adjacent bays in the plurality of bays in a manner that may avoid two adjacent bays having the openings on a same side. The frame for the wing may be positioned relative to the fuselage of an aircraft. The frame may be attached to the fuselage using the plurality of openings to access an interior of the frame.

In still yet another advantageous embodiment, a method may be provided for connecting a wing to a fuselage of an aircraft. A first number of openings in a first number of skin panels may be formed on a first side of a frame. The frame may comprise a front spar, a rear spar, and a number of spars located between the front spar and the rear spar in which the frame may have a plurality of bays. A second number of openings in a second number of skin panels may be formed on a second side of the frame. The first number of openings and the second number of openings may comprise a plurality of openings. The second number of skin panels may be on the second side of the frame in which the first side of the frame may be substantially opposite to the second side of the frame. The plurality of openings may be in locations such that each bay in a portion of the plurality of bays may have an opening and such that openings in the plurality of openings may alternate between the first side and the second side between adjacent bays in the plurality of bays in a manner that may avoid two adjacent bays having the openings on a same side. The frame for the wing may be positioned relative to the fuselage of the aircraft. The frame may be secured to the fuselage with fasteners using the plurality of openings to access an interior of the frame to install the fasteners. A plurality of covers for the plurality of openings may be installed. The plurality of covers may be configured to increase a load that may be supported by the first number of skin panels and the second number of skin panels when the plurality of covers is installed in the first number of openings and the second number of openings. The plurality of covers may be configured to carry at least a portion of the load across the plurality of covers. Maintenance for the wing may be performed using the plurality of openings to access the interior of the frame and the plurality of bays to perform the maintenance.

The features, functions, and advantages may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
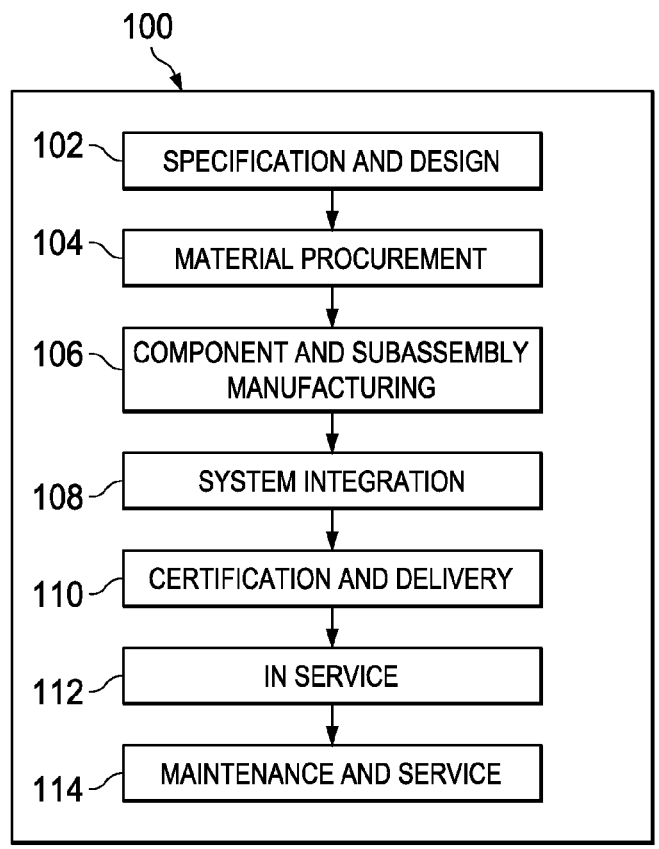
FIG. 1 is an illustration of an aircraft manufacturing and service method in accordance with an advantageous embodiment.
Figure 2:
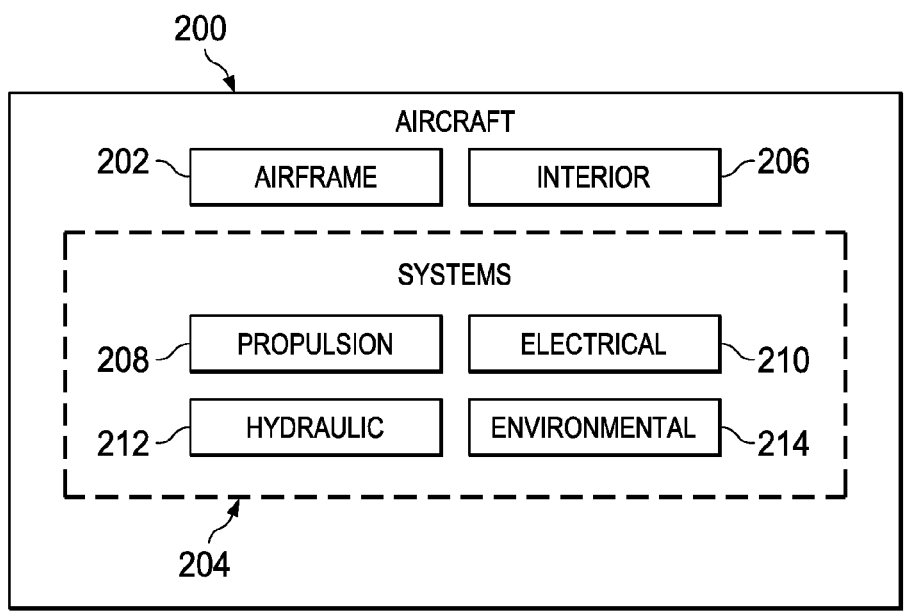
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. One or more of the different advantageous embodiments may be implemented on skin panels in airframe 202. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of considerations. For example, the different advantageous embodiments recognize and take into account that a wing may comprise a multi-spar structure or a spar box comprised, at least in part, of composite materials. The multi-spar structure may include spars that run inboard to outboard. The multi-spar structure may be attached to a fuselage of an aircraft and/or a corresponding wing on the other side of the aircraft through a joint system. This joint system may run substantially along a centerline of the fuselage for the aircraft.

The different advantageous embodiments recognize and take into account that the use of multiple spars in the structure of the wing may make the maintenance of a joint in the joint system more difficult. The joint may require inspection and/or maintenance. Access to this joint may be more difficult with additional spars located between the front spar and the rear spar. For example, without limitation, with the use of only a front spar and a rear spar, access to this joint may be made through an opening in one of the two spars and/or through a skin for the wing. In this example, the front spar and rear spar may form a single bay within the multi-spar structure.

The different advantageous embodiments recognize and take into account that with additional spars, additional bays may be present within the multi-spar structure. These additional spars may limit access to portions of the joint that may require maintenance. The maintenance may include inspecting the joint, reworking the joint, and/or performing other suitable maintenance operations. Access to the interior of the multi-spar structure also may be needed to attach the wing to form the joint.

The different advantageous embodiments recognize and take into account that one solution when using multiple spars for a frame may be to provide access to all of the bays by forming an opening to each bay in which all of the openings are in one skin panel. The different advantageous embodiments recognize and take into account that with all of the openings to all of the bays in one skin panel, loads carried by the wing may be distributed in an undesired manner. The different advantageous embodiments recognize and take into account that alternating the openings for each bay between two skin panels for a wing may provide a more advantageous load distribution for the wing as compared to forming all of the openings in one skin panel.

Thus, the advantageous embodiments may provide a method and apparatus for a multi-spar wing structure. In one advantageous embodiment, an apparatus may comprise a plurality of spars. The plurality of spars may include a front spar, a rear spar, and a number spars located between the front spar and the rear spar. The arrangement of the spars may form a frame having a plurality of bays.

The apparatus also may comprise a first number of skin panels on the first side of the frame and a second number of skin panels on the second side of the frame. The first side of the frame may be substantially opposite to the second side of the frame. A plurality of openings may be present in the first number of skin panels on the first side and in the number of skin panels on the second side. The plurality of openings may be in a location such that each bay in the plurality of bays may have an opening and such that openings may alternate between the first side and second side between adjacent bays in the plurality of bays. This placement of openings may be such that two adjacent bays may not have openings on a same side.

Figure 3:
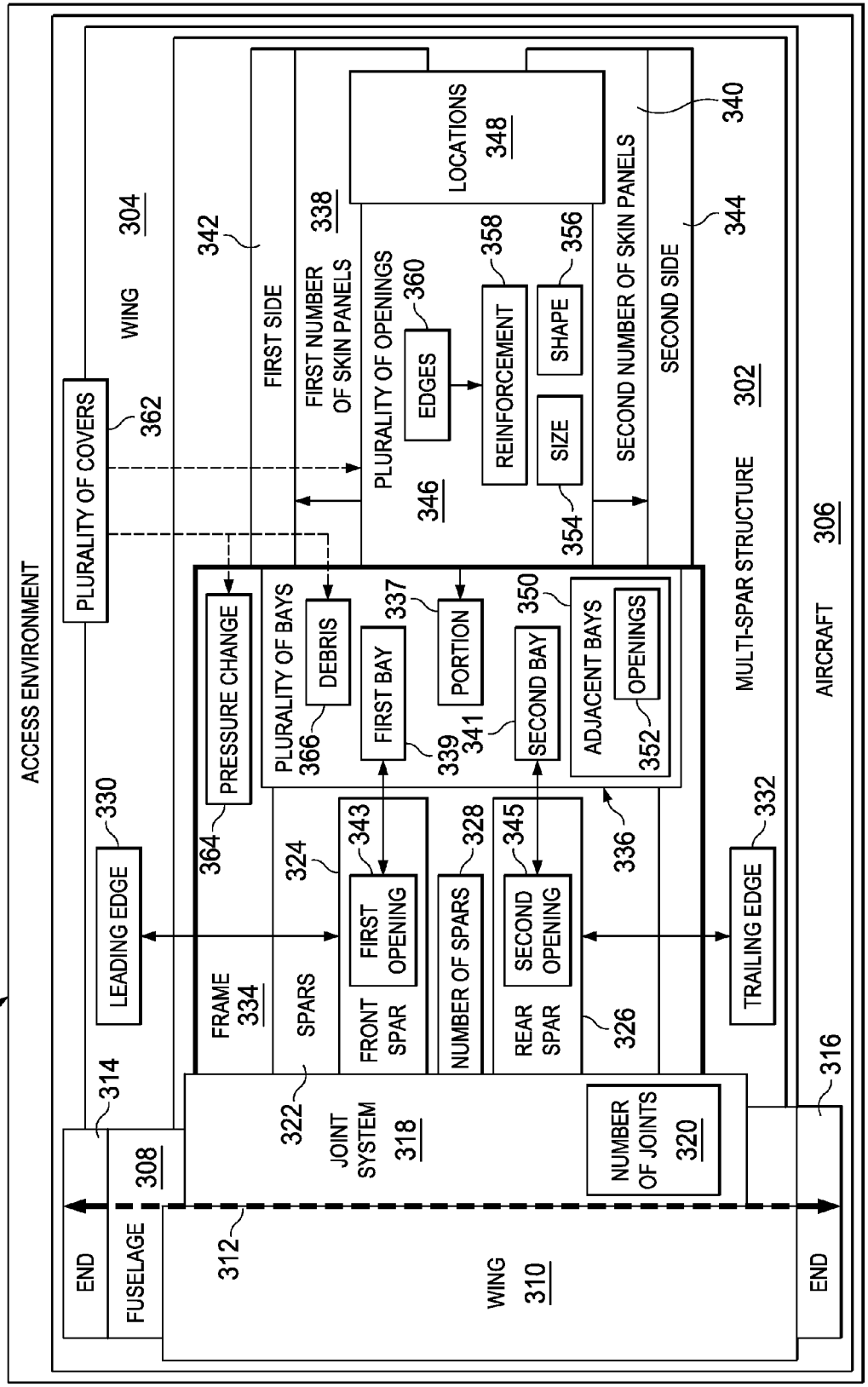
FIG. 3 is an illustration of an access environment in accordance with an advantageous embodiment.

Turning now to FIG. 3, an illustration of an access environment is depicted in accordance with an advantageous embodiment. In this illustrative example, access environment 300 may be implemented to provide access to different portions of airframe 202 in FIG. 2 in aircraft 200. This access may be provided during, for example, without limitation, component and subassembly manufacturing 106, in service 112, and maintenance and service 114 in aircraft manufacturing and service method 100 in FIG. 1.

For example, without limitation, multi-spar structure 302 may be located in wing 304. Wing 304 may be connected to fuselage 308 for aircraft 306. Wing 304 may take various forms. For example, without limitation, wing 304 may be a wing that provides lift, a horizontal stabilizer, a canard, or some other sort of airfoil. Additionally, wing 304 may be connected to wing 310. Wing 310 may be a corresponding wing to wing 304.

The connection of wing 304 to fuselage 308 and/or wing 310 may be near centerline 312 of aircraft 306. Centerline 312 may extend as a plane through end 314 and end 316 of fuselage 308. In these illustrative examples, the connection of wing 304 to fuselage 308 and/or wing 310 may be through joint system 318. Joint system 318 may comprise number of joints 320.

In these illustrative examples, multi-spar structure 302 may be configured to provide access to joint system 318. The access to joint system 318 may be provided during at least one of assembly of aircraft 306, maintenance of aircraft 306, and other stages during the life of aircraft 306.

In these illustrative examples, multi-spar structure 302 may comprise spars 322. Spars 322 may include front spar 324, rear spar 326, and number of spars 328. Front spar 324 may be located at or near leading edge 330 of multi-spar structure 302 in wing 304. Rear spar 326 may be located at or near trailing edge 332 of wing 304 in multi-spar structure 302. Leading edge 330 and trailing edge 332 may refer to the location of edges with respect to wing 304 on aircraft 306.

Number of spars 328 may be located between front spar 324 and rear spar 326. Front spar 324, rear spar 326, and number of spars 328 may be configured such that spars 322 do not intersect each other. Spars 322 may be configured to form frame 334 from multi-spar structure 302. Frame 334 may have plurality of bays 336. Plurality of bays 336 may be defined by spars 322. In other words, plurality of bays 336 may be bays located in spaces between front spar 324, rear spar 326, and number of spars 328 in multi-spar structure 302.

In these illustrative examples, multi-spar structure 302 also may include first number of skin panels 338 and second number of skin panels 340. First number of skin panels 338 may be on first side 342, while second number of skin panels 340 may be on second side 344. In these illustrative examples, first number of skin panels 338 and second number of skin panels 340 may be attached to frame 334.

In these illustrative examples, first number of skin panels 338 and second number of skin panels 340 may be comprised of a number of different types of materials. For example, without limitation, first number of skin panels 338 and second number of skin panels 340 may be comprised of a material selected from at least one of a composite material, aluminum, titanium, and other suitable types of materials.

In the different advantageous embodiments, plurality of openings 346 may be present in first number of skin panels 338 and in second number of skin panels 340. Plurality of openings 346 may be in locations 348. Locations 348 may be selected such that each bay in portion 337 of plurality of bays 336 has an opening in plurality of openings 346. Portion 337 may be some or all of plurality of bays 336.

In one illustrative example, portion 337 may not include first bay 339 or second bay 341 in plurality of bays 336. Portion 337 may include all bays in plurality of bays 336 between first bay 339 and second bay 341. In this illustrative example, first opening 343 to first bay 339 may be formed in front spar 324, and second opening 345 to second bay 341 may be formed in rear spar 326. First opening 343 and second opening 345 may be formed independently of plurality of openings 346 in this illustrative example. In this manner, plurality of openings 346, first opening 343, and second opening 345 may provide access to all of plurality of bays 336.

Additionally, locations 348 may alternate between first side 342 and second side 344 between adjacent bays 350. This alternating of plurality of openings 346 in locations 348 may be selected to avoid two of adjacent bays 350 having openings 352 on the same side. In other words, an opening in one bay may be located on first number of skin panels 338, while an opening in a second bay in adjacent bays 350 may be located on second number of skin panels 340.

In the different advantageous embodiments, this arrangement of plurality of openings 346 in locations 348 may be configured to increase a load that may be supported by first number of skin panels 338 and/or second number of skin panels 340 as compared to having openings 352 that may be next to each other in adjacent bays 350.

In the depicted examples, plurality of openings 346 may have size 354 and shape 356 that may provide access to number of joints 320 in joint system 318. This access may be provided for installation of wing 304 or during maintenance. Shape 356 may take a number of different forms. For example, without limitation, shape 356 may be a circle, an oval, a racetrack, or some other shape. In these illustrative examples, a racetrack may be an opening with substantially straight sides and curved ends. Shape 356 may be configured to carry at least a portion of a load around the plurality of openings and provide a desired level of access to plurality of bays 336.

In the different illustrative examples, at least some of plurality of openings 346 may have reinforcement 358. For example, without limitation, additional layers of a composite material may be located at edges 360 of plurality of openings 346. In other illustrative examples, a ring or other material may be placed around edges 360 of plurality of openings 346. In these illustrative examples, a cross-section of the additional layers of material or the ring may have a number of different shapes configured to provide reinforcement 358. For example, without limitation, the cross-section may have a T, L, Z, J, or some other suitable type of shape. Reinforcement 358 may provide additional load-carrying capability in first number of skin panels 338 and second number of skin panels 340.

Plurality of covers 362 may cover plurality of openings 346. Plurality of covers 362 may be configured to reduce at least one of pressure change 364 occurring within frame 334 in multi-spar structure 302 and an entry of debris 366 into plurality of bays 336.

Additionally, plurality of covers 362 also may provide reinforcement to plurality of openings 346. In particular, plurality of covers 362 may change load paths around plurality of openings 346 to at least partially be distributed across plurality of covers 362. In this manner, plurality of covers 362, when installed in plurality of openings 346, may increase a load that may be carried by first number of skin panels 338 and second number of skin panels 340.

The illustration of access environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, multi-spar structure 302 may be considered only a portion of wing 304, while in other advantageous embodiments, multi-spar structure 302 may form all of wing 304. Also, in some advantageous embodiments, multi-spar structure 302 may form a box similar to a wing box that may be attached to fuselage 308.

Further, in other illustrative examples, multi-spar structure 302 may be connected to a structure of fuselage 308, a frame within fuselage 308, or some other suitable portion of fuselage 308.

Figure 4:
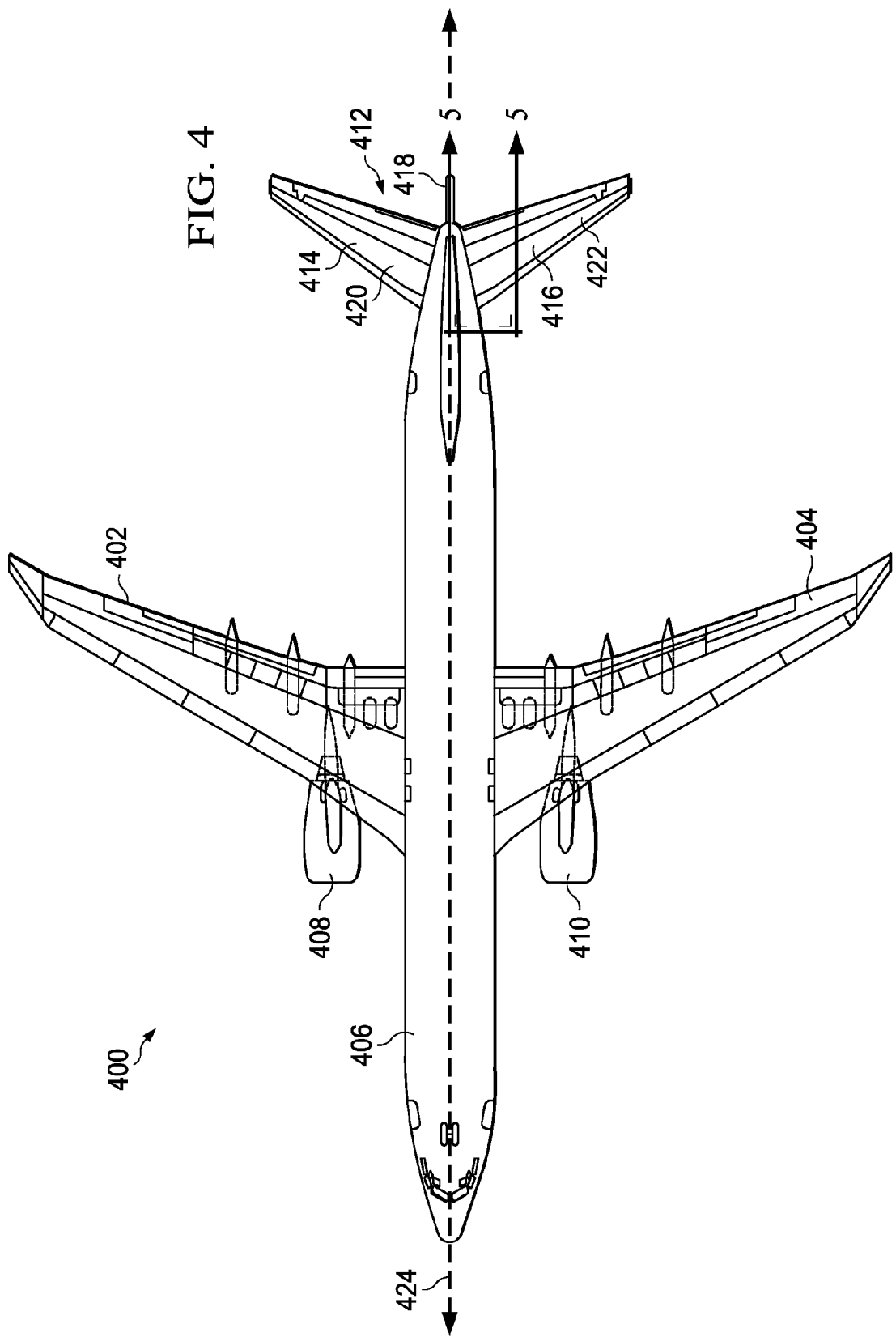
FIG. 4 is an illustration of an aircraft in accordance with an advantageous embodiment.

With reference now to FIG. 4, an illustration of an aircraft is depicted in accordance with an advantageous embodiment. Aircraft 400 is an example of one implementation for aircraft 200 in FIG. 2 in which access environment 300 in FIG. 3 may be implemented. As depicted, aircraft 400 may have wing 402 and wing 404 attached to fuselage 406. Aircraft 400 also may include wing-mounted engine 408 and wing-mounted engine 410. Tail 412 on fuselage 406 may include wing 414, wing 416, and vertical stabilizer 418. Wing 414 and wing 416 may take the form of horizontal stabilizer 420 and horizontal stabilizer 422, respectively.

In these depicted examples, multi-spar structure 302 in FIG. 3 may be implemented in at least one of wing 402, wing 404, wing 414, wing 416, and vertical stabilizer 418. As depicted, aircraft 400 may have centerline 424 through fuselage 406.

Figure 5:
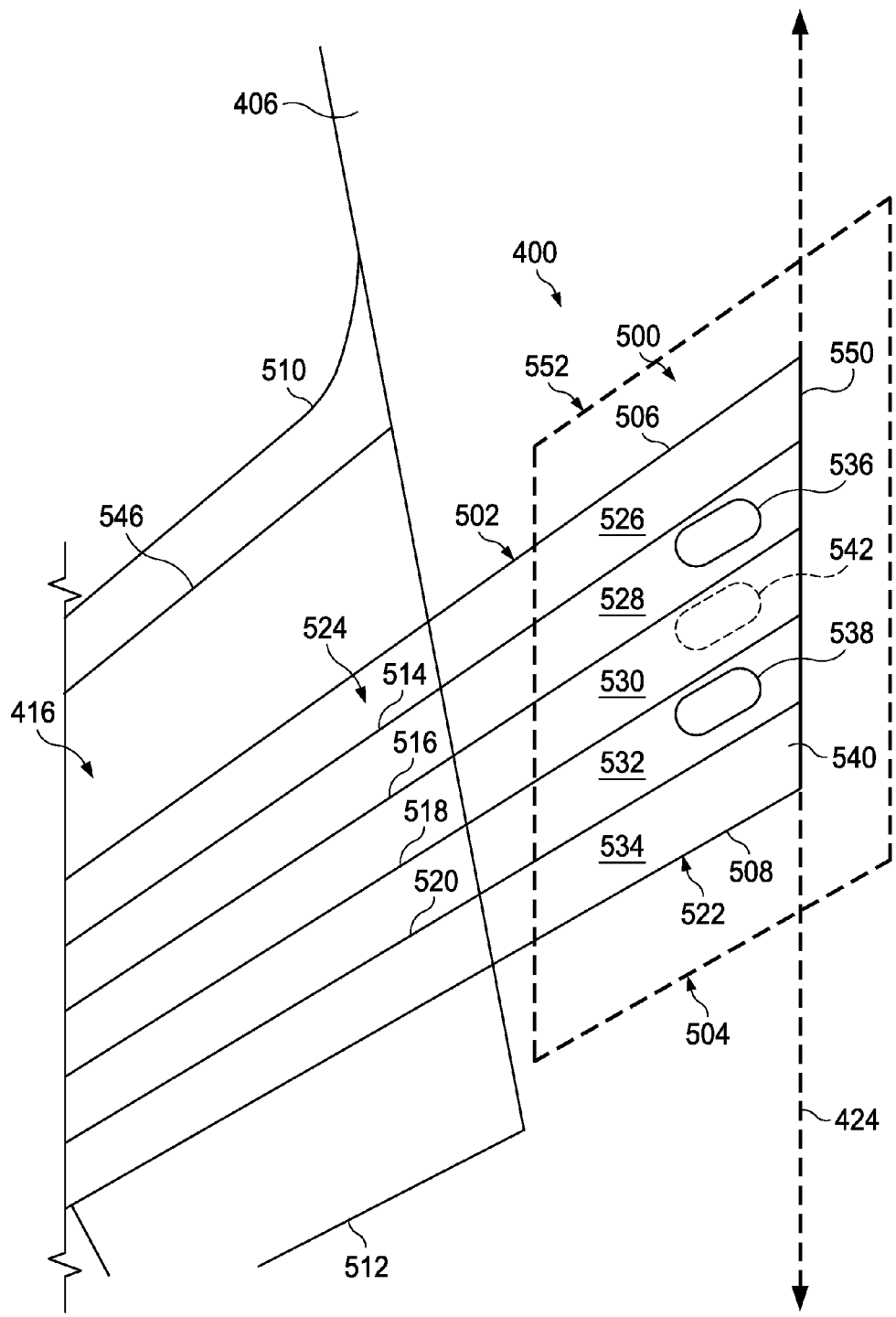
FIG. 5 is an illustration of a bottom phantom view of a wing with a multi-spar structure in accordance with an advantageous embodiment.

With reference now to FIG. 5, an illustration of a bottom phantom view of a wing with a multi-spar structure is depicted in accordance with an advantageous embodiment. In this illustrative example, a bottom phantom view of wing 416 attached to fuselage 406 of aircraft 400 in FIG. 4 may be illustrated taken along lines 5-5 in FIG. 4. As depicted, multi-spar structure 500 may be located in wing 416 of aircraft 400 in FIG. 4. Further, multi-spar structure 500 may be a part of wing 416 that may be connected to fuselage 406 of aircraft 400 in FIG. 4 and/or wing 414 in FIG. 4.

In this illustrative example, multi-spar structure 500 may have spars 502. In these illustrative examples, spars 502 may be substantially parallel to each other. In other words, spars 502 may not intersect each other or cross each other.

Spars 502 may include front spar 506, rear spar 508, and number of spars 504. Front spar 506 may be the spar located closest to leading edge 510, while rear spar 508 may be the spar located closest to trailing edge 512 of wing 416 in this illustrative example. Number of spars 504 may include spars 514, 516, 518, and 520. Spars 502 may define frame 522 for multi-spar structure 500.

Plurality of bays 524 may be present in frame 522. Plurality of bays 524 may be located between spars 502. In other words, spars 502 may define plurality of bays 524. In these examples, plurality of bays 524 may include bays 526, 528, 530, 532, and 534.

In this illustrative example, wing 416 may include other structures in addition to multi-spar structure 500. For example, without limitation, wing 416 may include additional spars, such as spar 546; and ribs, such as rib 550. Section 552 of multi-spar structure 500 may be defined by front spar 506, rear spar 508, rib 550, and centerline 424 of fuselage 406.

In this illustrative example, wing 416 may be connected to fuselage 406 at centerline 424 of fuselage 406. Wing 416 may also be connected to wing 414 in FIG. 4 at centerline 424 of fuselage 406. Wing 416 may be connected to fuselage 406 and/or wing 414 substantially at centerline 424 using a joint system, such as joint system 318 in FIG. 3.

As depicted, locations 536, 538, and 542 may be present within section 552 of multi-spar structure 500. Location 536 and location 538 may be locations at which openings may be present for bay 528 and bay 532, respectively. Further, location 536 and location 538 may be on second side 540 of frame 522 for multi-spar structure 500. Second side 540 may be substantially opposite to a first side (not shown) of frame 522. Location 542, depicted in phantom in this example, may be a location for an opening on the first side of frame 522.

In this manner, openings may be alternated between the first side of frame 522 and second side 540. Further, openings may not be present on the same side for adjacent bays. For example, without limitation, bay 528 and bay 530 may be adjacent bays. Location 536 and location 542 may not be present on the same side of frame 522. Locations 536, 538, and 542 may be present within section 552 of multi-spar structure 500.

Figure 6:
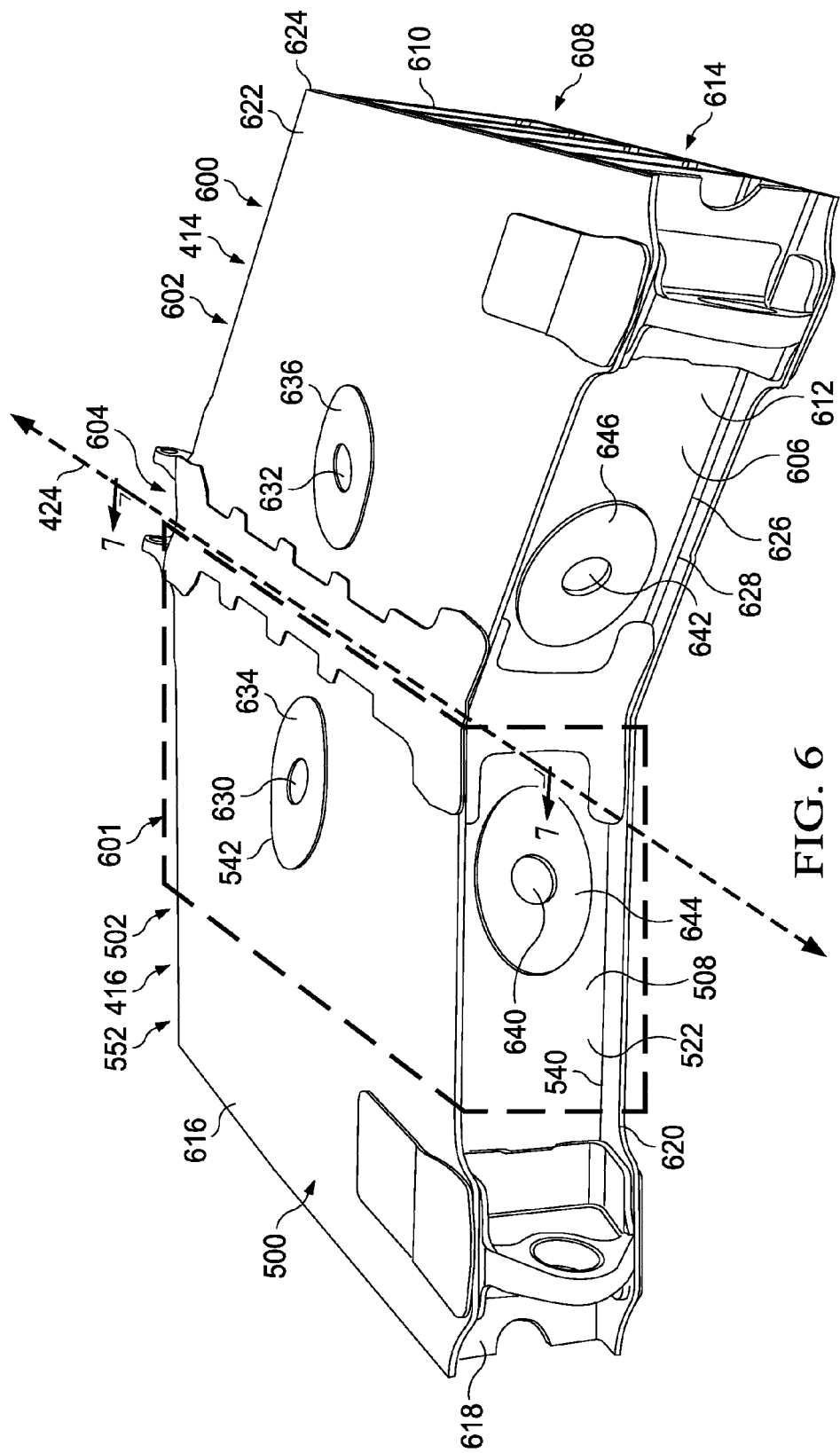
FIG. 6 is an illustration of a top perspective view of a section of a first wing connected to a section of a second wing in accordance with an advantageous embodiment.

With reference now to FIG. 6, an illustration of a top perspective view of a section of a first wing connected to a section of a second wing is depicted in accordance with an advantageous embodiment. In this illustrative example, section 552 of multi-spar structure 500 of wing 416 in FIG. 5 may be connected to section 600 of multi-spar structure 602 of wing 414 at centerline 424 in FIG. 4.

As depicted, section 552 and section 600 may be connected by joint system 604. Further, section 552 and section 600 may be connected by joint system 604 inside of fuselage 406 in FIG. 4. Additionally, subsection 601 may be a portion of section 552.

In this depicted example, section 600 of multi-spar structure 602 may be substantially symmetrical to section 552 of multi-spar structure 500. Further, multi-spar structure 500 of wing 416 may be substantially symmetrical to multi-spar structure 602 of wing 414. Multi-spar structure 602 may have frame 606. Frame 606 may be comprised of spars 608. Spars 608 may include front spar 610, rear spar 612, and number of spars 614. Number of spars 614 may be located between front spar 610 and rear spar 612.

In this illustrative example, first skin panel 616 may be attached to first side 618 of frame 522 for multi-spar structure 500. Second skin panel 620 may be attached to second side 540 of frame 522. As depicted, first skin panel 616 may be located substantially opposite of second skin panel 620.

Similarly, first skin panel 622 may be attached to first side 624 of frame 606 for multi-spar structure 602. Second skin panel 626 may be attached to second side 628 of frame 606. Further, first skin panel 622 may be located substantially opposite of second skin panel 626.

As depicted, opening 630 may be present in first skin panel 616 on first side 618 of frame 522. Opening 630 may be in location 542 such that opening 630 may provide access to bay 530 in FIG. 5. Similarly, opening 632 may be present in first skin panel 622 on first side 624 of frame 606.

Cover 634 may be installed in opening 630. In this illustrative example, cover 634 may be installed within opening 630 and may be substantially flush with first skin panel 616. In other illustrative examples, cover 634 may be installed such that cover 634 lies over opening 630 or is in opening 630 in some other suitable manner. Similarly, cover 636 may be installed in opening 632.

Further, as depicted in this example, opening 640 may be present in rear spar 508. Opening 640 may provide access to bay 534 in FIG. 5. In this manner, only a portion of the bays in plurality of bays 524 in FIG. 5 may be provided access through openings in first skin panel 616. Similarly, opening 642 may be present in rear spar 612. As depicted, cover 644 may be installed in opening 640 and cover 646 may be installed in opening 642.

Figure 7:
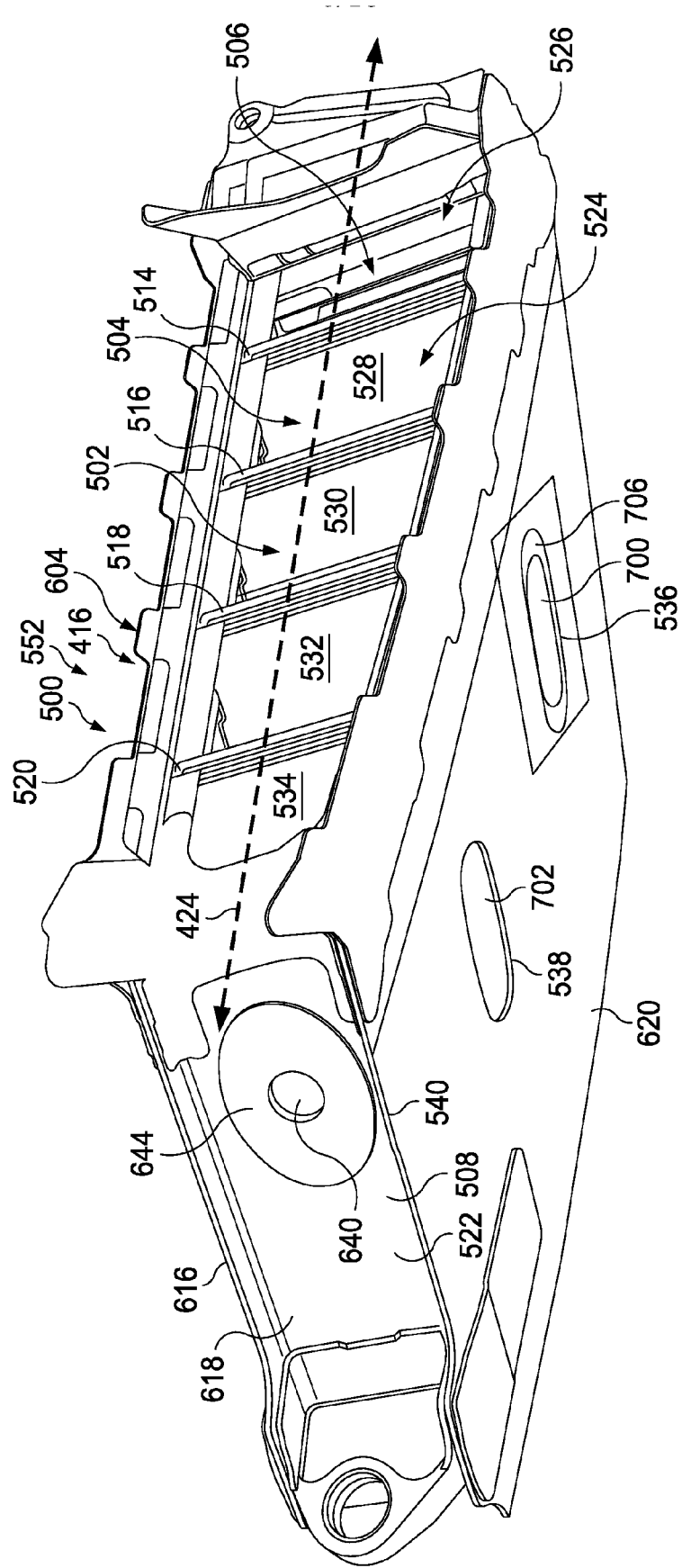
FIG. 7 is an illustration of a bottom perspective view of a section of a multi-spar structure for a wing in accordance with an advantageous embodiment.

With reference now to FIG. 7, an illustration of a bottom perspective view of a section of a multi-spar structure for a wing is depicted in accordance with an advantageous embodiment. In this illustrative example, a bottom perspective view of multi-spar structure 500 is depicted taken along lines 7-7 in FIG. 6 through centerline 424. Plurality of bays 524 may be seen for section 552 of multi-spar structure 500 for wing 416 in FIGS. 5 and 6.

In this illustrative example, opening 700 and opening 702 may be present at location 536 and location 538, respectively. Opening 700 and opening 702 may be in second skin panel 620 on second side 540 of frame 522. Opening 700 and opening 702 may provide access to bay 528 and bay 532, respectively.

As depicted, a cover may not be placed in opening 700 or opening 702 in this example. However, edge 706 of opening 700 may be reinforced in this illustrative example. Edge 706 may be reinforced with additional material around edge 706 of opening 700. For example, without limitation, the additional material may be additional layers of composite material that are added to second skin panel 620 around edge 706. These layers of composite material may be added to carry loads around opening 700. Further, these layers of composite material may then be cured to provide reinforcement for edge 706. In other illustrative examples, edge 706 may be reinforced by placing a cap in opening 700 that extends out from edge 706.

In this manner, opening 700, opening 630 in FIG. 6, and opening 702 may alternate between first side 618 and second side 540 of frame 522. In this manner, two adjacent bays in plurality of bays 524 may not have openings on the same side. Further, only a portion of plurality of bays 524 may have an opening in one of first skin panel 616 or second skin panel 620.

In these illustrative examples, an opening in one bay may provide access to the two spars defining the bay. For example, without limitation, opening 702 may provide access to both spar 518 and spar 520.

Figure 8:
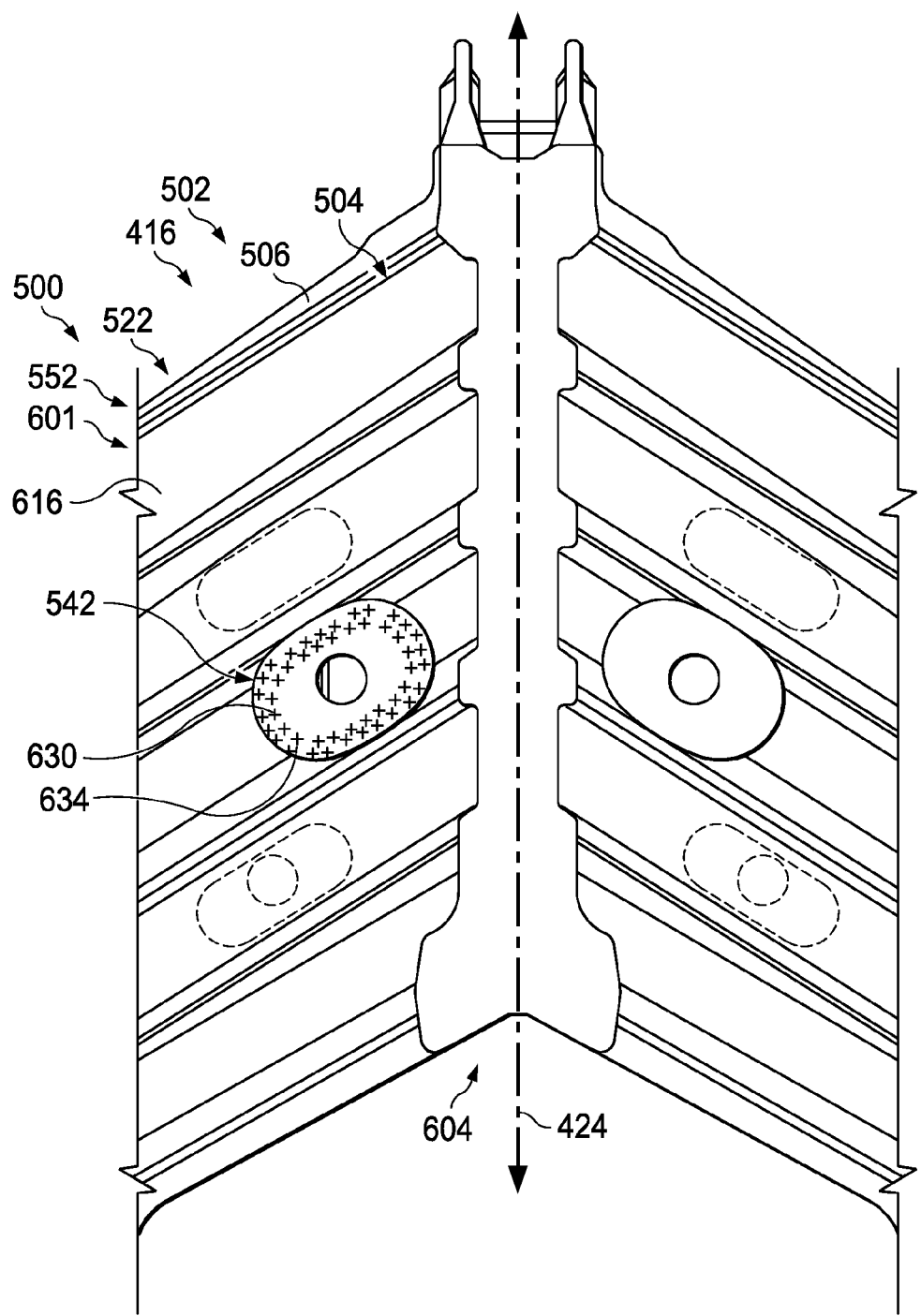
FIG. 8 is an illustration of a phantom view of a section of a multi-spar structure in accordance with an advantageous embodiment.

With reference now to FIG. 8, an illustration of a phantom top view of a section of a multi-spar structure is depicted in accordance with an advantageous embodiment. In this illustrative example, subsection 601 of section 552 of multi-spar structure 500 may be seen from first side 618 in FIG. 6 of frame 522 for multi-spar structure 500 with first skin panel 616 shown in phantom view to provide a clearer view of plurality of bays 524 in FIG. 5. As depicted, opening 630 may be present.

Figure 9:
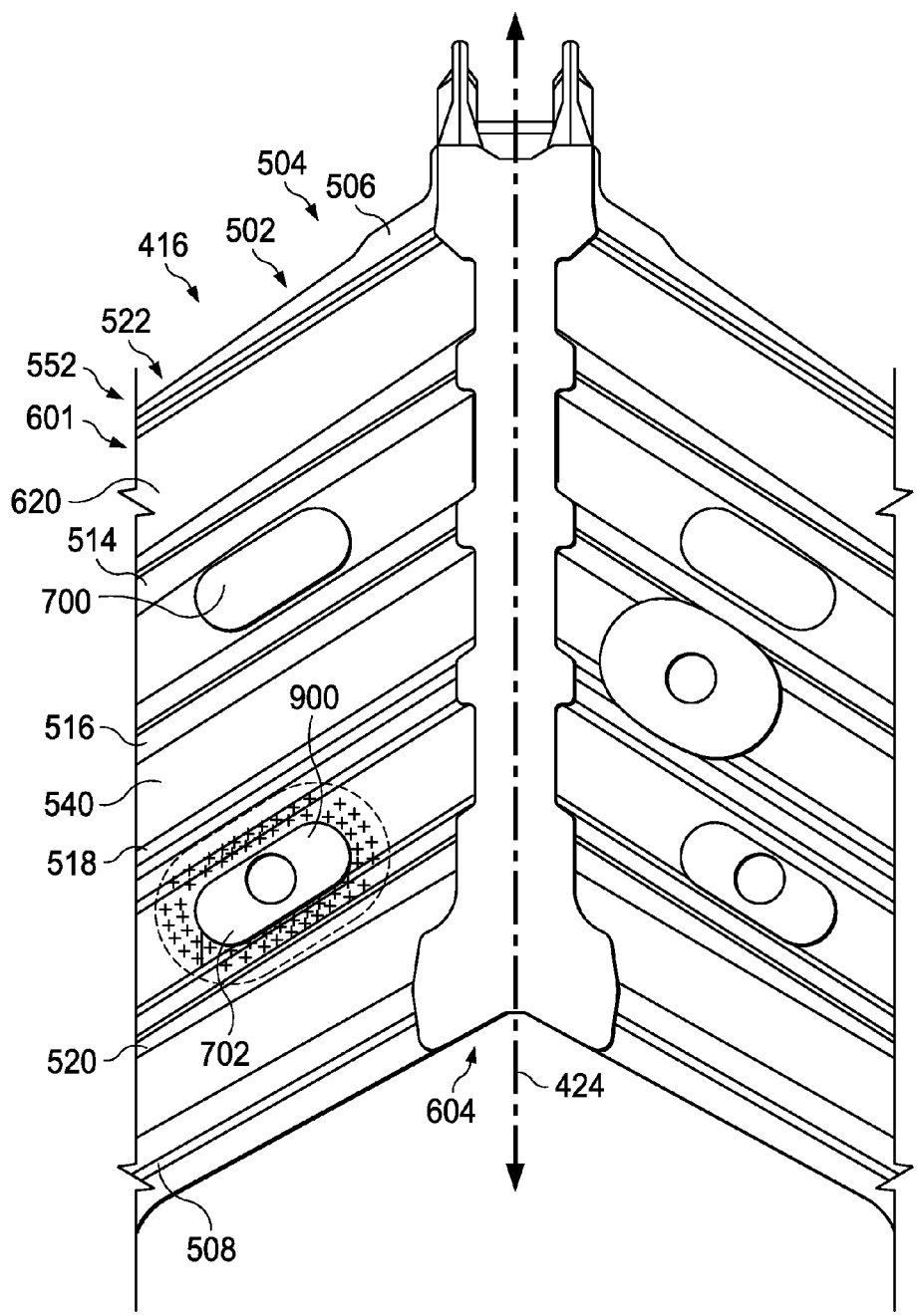
FIG. 9 is an illustration of an exposed top view of a section of a multi-spar structure in accordance with an advantageous embodiment.

With reference now to FIG. 9, an illustration of an exposed top view of a section of a multi-spar structure is depicted in accordance with an advantageous embodiment. In this illustrative example, section 552 of multi-spar structure 500 may be seen from first side 618 in FIG. 6 of frame 522 for multi-spar structure 500. Further, first skin panel 616 may be removed in this depicted example.

With first skin panel 616 removed in this example, opening 700 and opening 702 may be seen in second skin panel 620 attached to second side 540 of frame 522. Further, cover 900 may be installed in opening 702 in this illustrative example.

Figure 10:
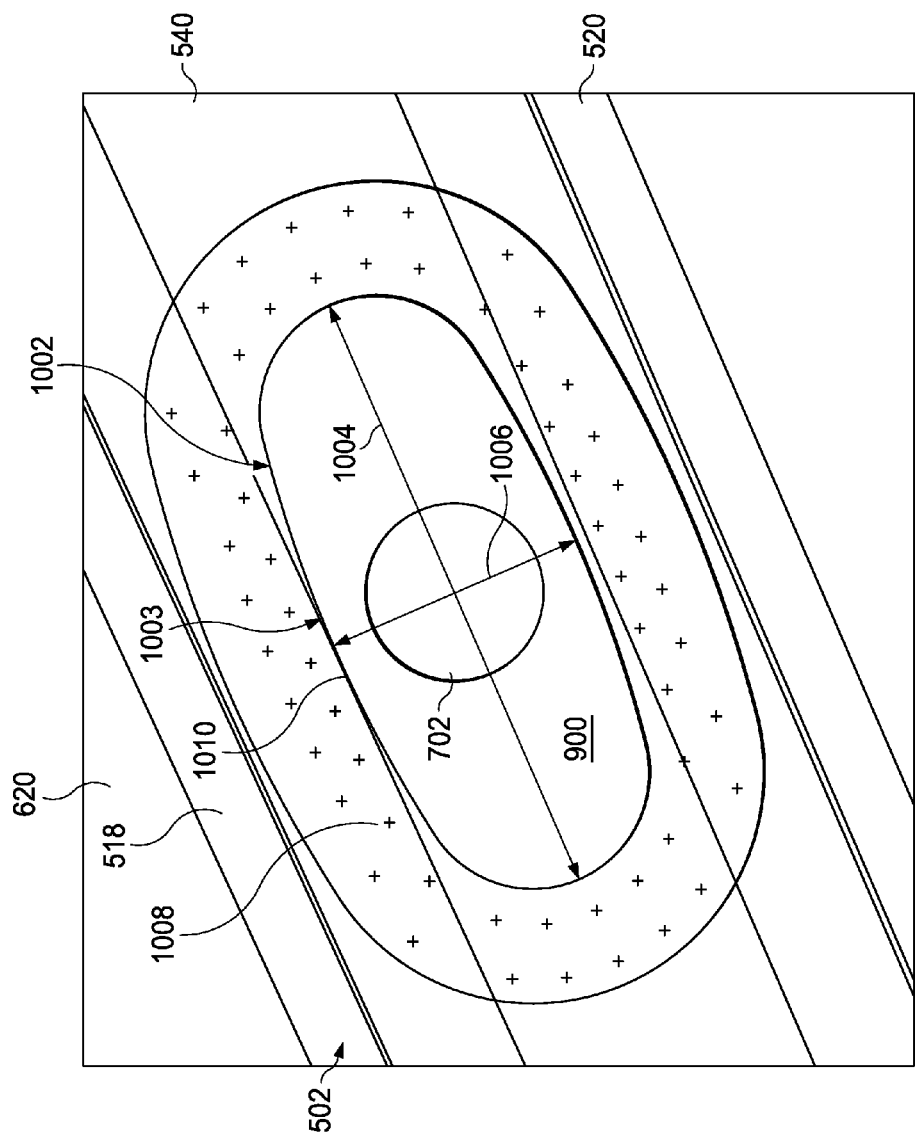
FIG. 10 is an illustration of a hole in a skin panel in accordance with an advantageous embodiment.

Turning now to FIG. 10, an illustration of a hole in a skin panel is depicted in accordance with an advantageous embodiment. In this illustrative example, opening 702 in second skin panel 620 may be seen with cover 900 installed in opening 702. As depicted, opening 702 may have shape 1002. Shape 1002 may take the form of racetrack 1003 in this depicted example.

Additionally, opening 702 may have first diameter 1004 and second diameter 1006. First diameter 1004 may be, for example, without limitation, about 12 inches. Second diameter 1006 may be, for example, without limitation, about 6.75 inches. Of course, in other illustrative examples, openings may have different sizes and/or shapes as compared to opening 702.

In this illustrative example, edge 1010 of opening 702 may be reinforced. In particular, additional material 1008 around edge 1010 may be provided to reinforce edge 1010 of opening 702. In this manner, a reduction in the load that can be carried by second skin panel 620 from the presence of opening 702 may be reduced.

Figure 11:
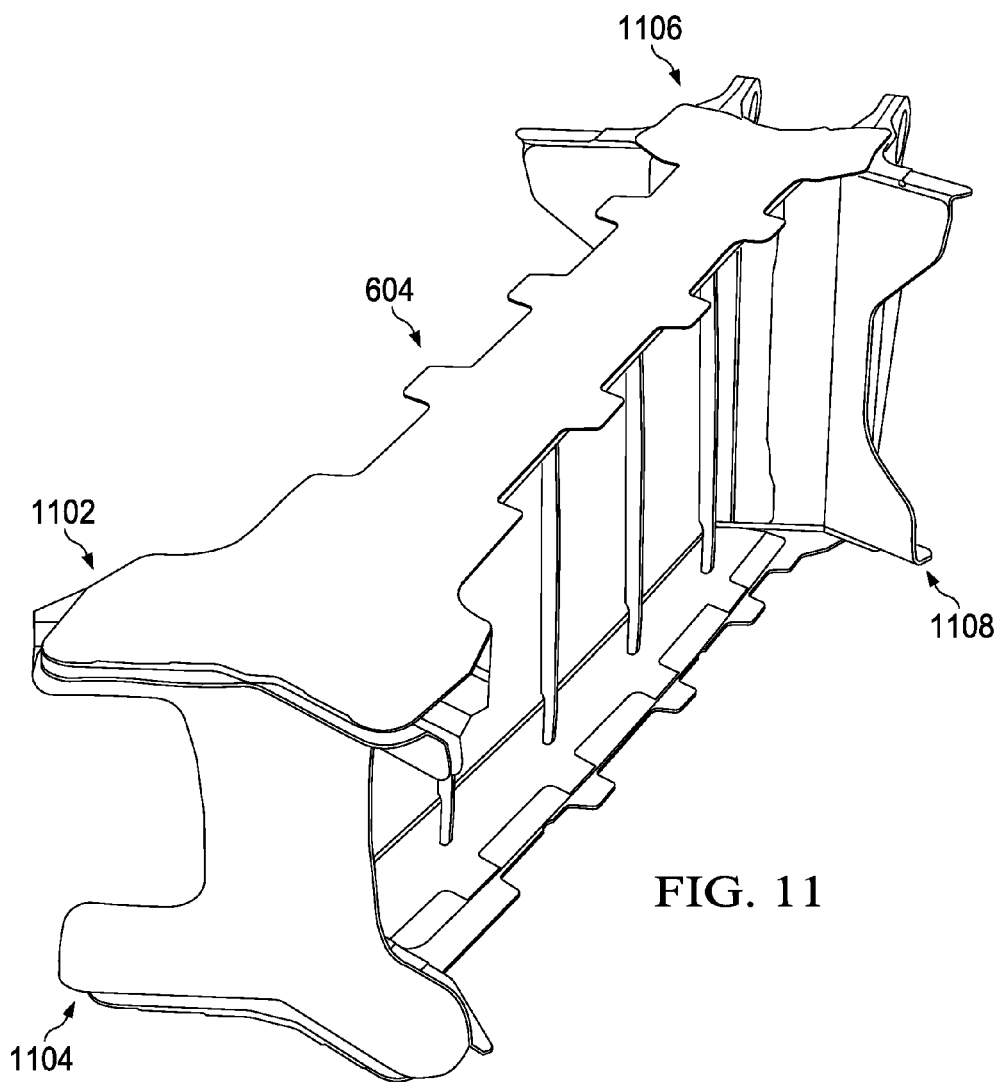
FIG. 11 is an illustration of a joint system in accordance with an advantageous embodiment.

With reference now to FIG. 11, an illustration of a joint system is depicted in accordance with an advantageous embodiment. In this illustrative example, joint system 604 in FIG. 6 may comprise joint 1102, joint 1104, joint 1106, and joint 1108.

Joint 1102 and joint 1106 may be configured to connect first skin panel 616 for wing 416 in FIG. 6 and first skin panel 622 for wing 414 in FIG. 6. Joint 1104 and joint 1108 may be configured to connect second skin panel 620 for wing 416 in FIG. 6 and second skin panel 626 for wing 414 in FIG. 6.

In this manner, loads may be distributed across first skin panel 616 and first skin panel 622 and across second skin panel 620 and second skin panel 626 in FIG. 6.

Figure 12:
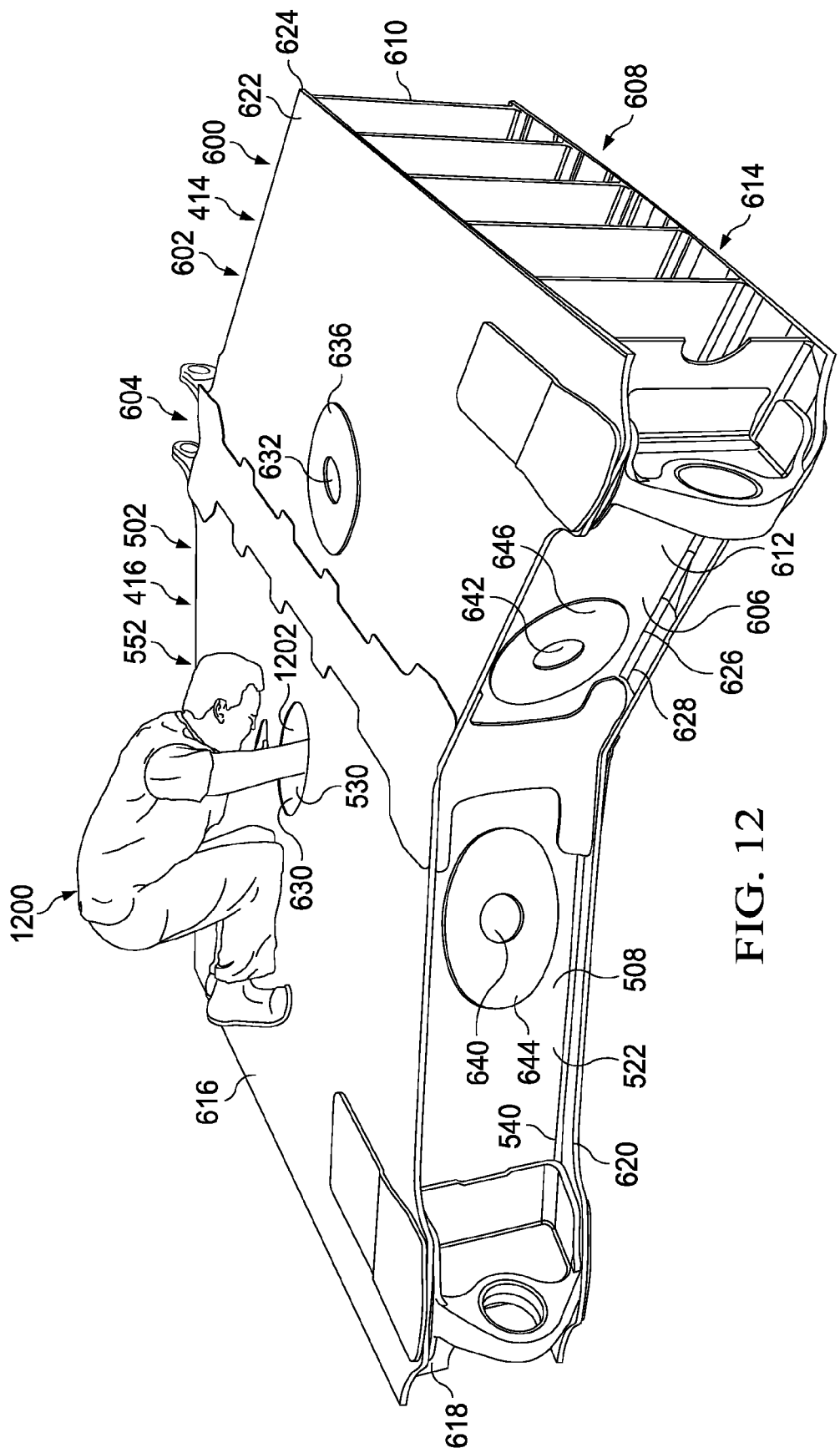
FIG. 12 is an illustration of an operator accessing an interior of a multi-spar structure in accordance with an advantageous embodiment.

With reference now to FIG. 12, an illustration of an operator accessing an interior of a multi-spar structure is depicted in accordance with an advantageous embodiment. In this illustrative example, operator 1200 may access interior 1202 of multi-spar structure 500 through opening 630 in first skin panel 616.

Operator 1200 may access interior 1202 to perform operations on joint system 604. In particular, operator 1200 may access interior 1202 to access joint system 604 through bay 530. Operator 1200 may access interior 1202 to perform operations, such as, for example, without limitation, installing shims, drilling holes for fasteners, installing the fasteners, replacing fasteners, performing maintenance on joint system 604, inspecting joint system 604, and/or other suitable operations.

Figure 13:
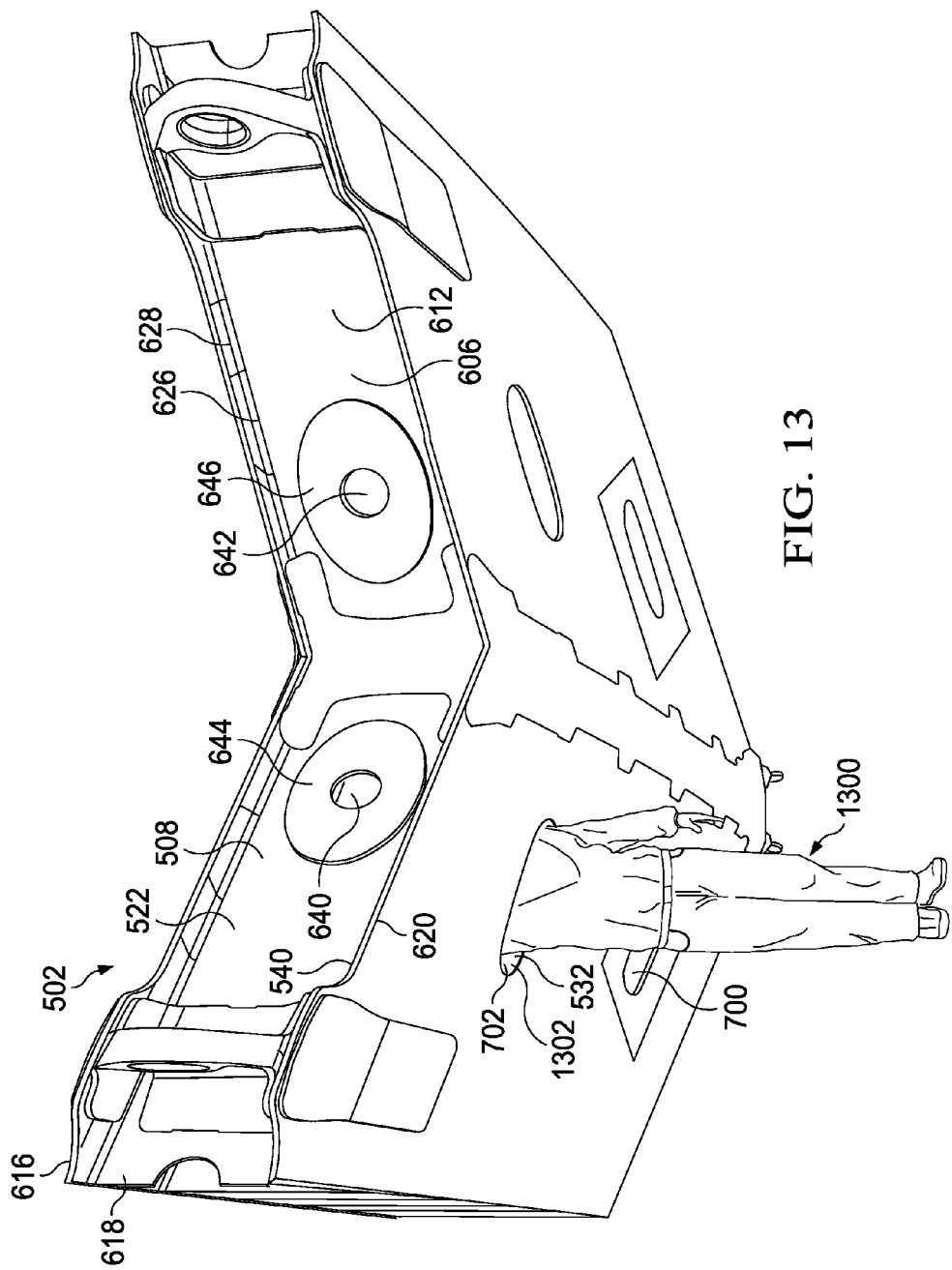
FIG. 13 is an illustration of an operator accessing an interior of a multi-spar structure in accordance with an advantageous embodiment.

With reference now to FIG. 13, an illustration of an operator accessing an interior of a multi-spar structure is depicted in accordance with an advantageous embodiment. In this illustrative example, operator 1300 may access interior 1302 of multi-spar structure 500 through opening 702 in second skin panel 620. In particular, operator 1300 may access bay 532.

Figure 14:
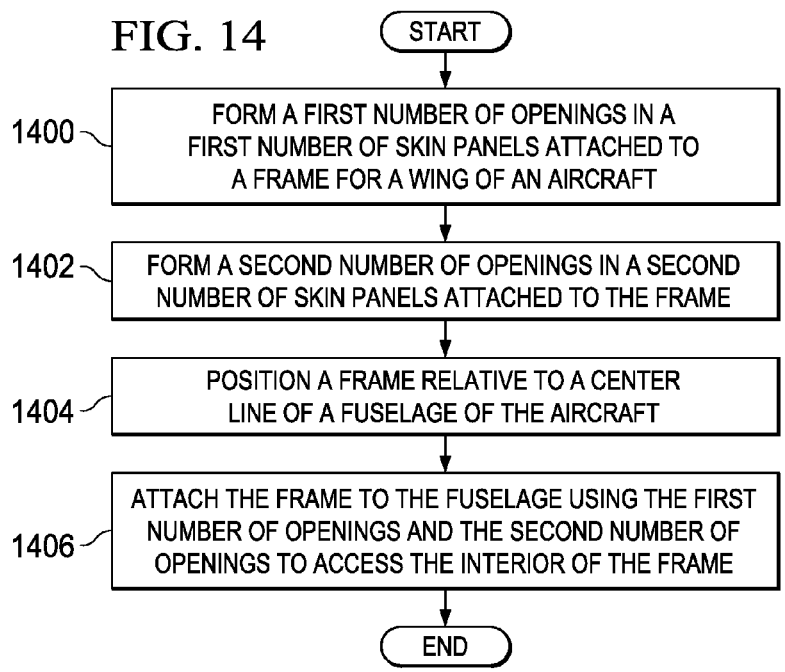
FIG. 14 is an illustration of a flowchart of a process for attaching a wing to a fuselage of an aircraft in accordance with an advantageous embodiment.

With reference now to FIG. 14, an illustration of a flowchart of a process for attaching a wing to a fuselage of an aircraft is depicted in accordance with an advantageous embodiment. The process illustrated in FIG. 14 may be implemented in access environment 300 in FIG. 3. This process may be implemented to attach wing 304 to fuselage 308 of aircraft 306 and/or wing 310 of aircraft 306 at centerline 312 in FIG. 3.

The process may begin by forming a first number of openings in first number of skin panels 338 attached to frame 334 for wing 304 of aircraft 306 (operation 1400). First number of skin panels 338 may be attached to first side 342 of frame 334 for multi-spar structure 302. Multi-spar structure 302 may be a part of wing 304. Frame 334 may comprise front spar 324, rear spar 326, and number of spars 328 located between front spar 324 and rear spar 326.

The process may then form a second number of openings in second number of skin panels 340 attached to frame 334 (operation 1402). The first number of openings and second number of openings may form plurality of openings 346 in FIG. 3. Second number of skin panels 340 may be attached to second side 344 of frame 334.

Thereafter, the process may position frame 334 relative to centerline 312 of fuselage 308 of aircraft 306 (operation 1404). The process then may attach frame 334 to fuselage 308 using the first number of openings and the second number of openings to access the interior of frame 334 (operation 1406), with the process terminating thereafter. For example, without limitation, in operation 1404, an operator may access the interior of frame 334 to install fasteners to attach frame 334 to fuselage 308. In some illustrative examples, in operation 1404, frame 334 may be attached to fuselage 308 and/or wing 310.

Figure 15:
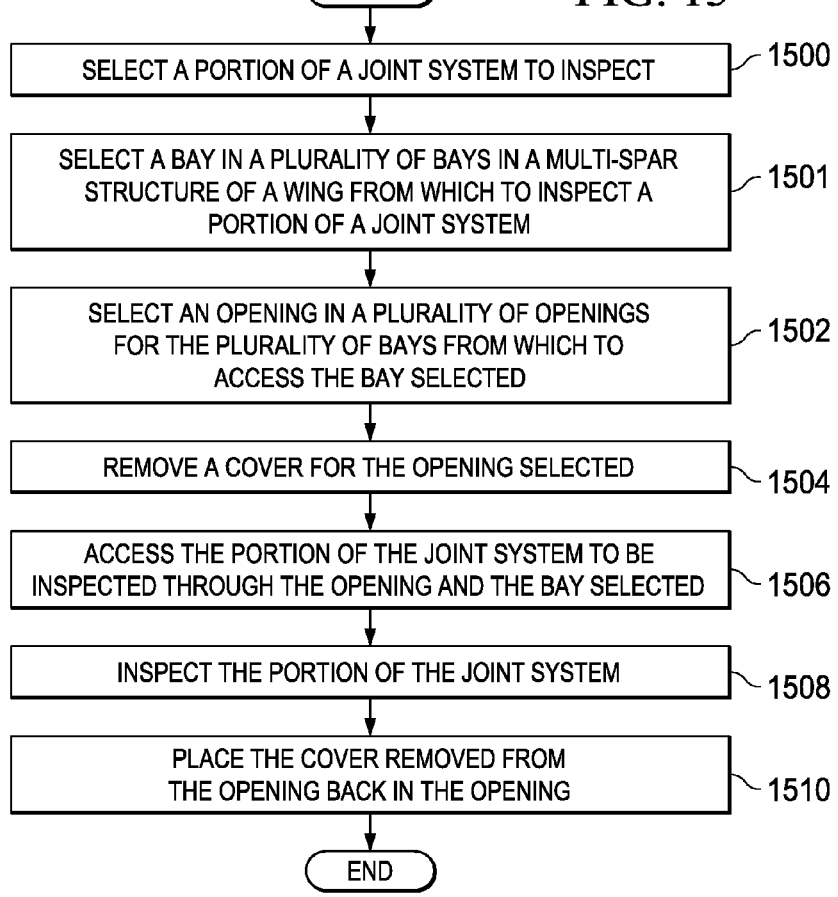
FIG. 15 is an illustration of a flowchart of a process for inspecting a joint system for a wing of an aircraft in accordance with an advantageous embodiment.

With reference now to FIG. 15, an illustration of a flowchart of a process for inspecting a joint system for a wing of an aircraft is depicted in accordance with an advantageous embodiment. The process illustrated in FIG. 15 may be implemented in access environment 300 in FIG. 3. This process may be implemented to inspect a portion of joint system 318 for wing 304 in FIG. 3.

The process may begin by selecting a portion of joint system 318 to inspect (operation 1500). Joint system 318 may connect wing 304 of aircraft 306 to fuselage 308 of aircraft 306 and/or wing 310. The process may then select a bay in plurality of bays 336 in multi-spar structure 302 of wing 304 from which to inspect the portion of joint system 318 selected (operation 1501).

The process then may select an opening in plurality of openings 346 for plurality of bays 336 from which to access the bay selected (operation 1502). In operation 1502, the opening selected may be in first number of skin panels 338 or in second number of skin panels 340.

Thereafter, the process may remove a cover for the opening selected (operation 1504). The cover may be one of plurality of covers 362 covering plurality of openings 346. The process may then access the portion of joint system 318 to be inspected through the opening and the bay selected (operation 1506).

The process may then inspect the portion of joint system 318 (operation 1508). In operation 1508, inspecting the portion of joint system 318 may include performing operations on joint system 318. For example, without limitation, if an operator determines that the portion of joint system 318 being inspected needs to have a fastener replaced, the operator may replace the fastener in operation 1508.

Thereafter, the process may place the cover removed from the opening selected back in the opening (operation 1510), with the process terminating thereafter. The process presented in FIG. 15 may be repeated, depending on the implementation. For example, this process may be repeated if more than one portion of joint system 318 needs to be inspected or if the portion of joint system 318 being inspected needs to be accessed from more than one bay.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, without limitation, in some advantageous embodiments, operation 1402 may be performed before operation 1400 in FIG. 14. In still other advantageous embodiments, operation 1400 and operation 1402 may be performed after operation 1404 in FIG. 14. In other words, plurality of openings 346 may be formed in first number of skin panels 338 and in second number of skin panels 340 after frame 334 has been positioned relative to fuselage 308 in FIG. 3.

Thus, the advantageous embodiments may provide a method and apparatus for a multi-spar wing structure. In one advantageous embodiment, an apparatus may comprise a plurality of spars. The plurality of spars may include a front spar, a rear spar, and a number spars located between the front spar and the rear spar. The arrangement of the spars may form a frame having a plurality of bays.

The apparatus also may comprise a first number of skin panels on the first side of the frame, and a second number of skin panels on the second side of the frame. The first side of the frame may be substantially opposite to the second side of the frame. A plurality of openings may be present in the first number of skin panels on the first side and in the second number of skin panels on the second side. The plurality of openings may be in a location such that each bay in the plurality of bays may have an opening and such that openings may alternate between the first side and second side between adjacent bays in the plurality of bays. This placement of openings may be such that two adjacent bays may not have openings on a same side.

The description of the different advantageous embodiments has been presented for purposes of illustration and description and is not intended to be exhaustive or limited to the embodiments in the form disclosed. Many modifications and variations may be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for increasing a load carried by skin panels with a plurality of openings, the apparatus comprising:
   a frame for an airfoil of an aircraft having a first side and a second side;
   skin panels on the frame;
   a plurality of bays located within the frame; and
   an arrangement of the plurality of openings in the skin panels in which the plurality of openings alternate between the first side and the second side in a manner that avoids two adjacent bays in the plurality of bays having openings on a same side in which the load carried by the skin panels on the airfoil is increased by the arrangement of the plurality of openings.

2. The apparatus of claim 1, wherein locations of the plurality of openings are selected to increase the load carried by the skin panels.

3. The apparatus of claim 1, wherein an opening in the plurality of openings has a size and a shape selected to provide access to an interior of the airfoil.

4. The apparatus of claim 3, wherein the airfoil is a wing and access to the interior provides access to a joint system connecting the frame of the wing to a fuselage of the aircraft.

5. The apparatus of claim 3, wherein the shape of the opening is selected from one of a circle, an oval, and a race track and wherein the shape is configured to carry at least a portion of a load around the opening.

6. The apparatus of claim 1 further comprising:
   a plurality of covers configured to cover the plurality of openings.

7. The apparatus of claim 6, wherein the plurality of covers is configured to increase a load supported by the skin panels when the plurality of covers is installed in the plurality of openings and carry at least a portion of the load across the plurality of covers.

8. The apparatus of claim 6, wherein the plurality of covers is configured to reduce at least one of a pressure change inside the frame during flight of the aircraft and debris entering the plurality of bays.

9. The apparatus of claim 1, wherein reinforcements are placed at edges of the plurality of openings to increase the load carried by the skin panels on the airfoil.

10. The apparatus of claim 9, wherein the reinforcements comprise layers of composite material.

11. The apparatus of claim 1, wherein the frame comprises:
    a front spar;
    a rear spar; and
    a number of spars located between the front spar and the rear spar in which the front spar, the rear spar, and the number of spars form the frame having the plurality of bays.

* * * * *